United States Patent
Naughton

(10) Patent No.: US 10,955,573 B2
(45) Date of Patent: *Mar. 23, 2021

(54) MULTI FACILITY EARTHQUAKE AUTOMATION SYSTEM AND METHOD

(71) Applicant: Sensormatic Electronics, LLC, Boca Raton, FL (US)

(72) Inventor: Thomas P. Naughton, Groton, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,418

(22) Filed: Apr. 5, 2019

(65) Prior Publication Data

US 2019/0235103 A1  Aug. 1, 2019

Related U.S. Application Data

(63) Continuation of application No. 15/624,195, filed on Jun. 15, 2017.

(51) Int. Cl.
| | |
|---|---|
| *G08B 23/00* | (2006.01) |
| *G01V 1/00* | (2006.01) |
| *G08B 21/18* | (2006.01) |
| *H04L 29/08* | (2006.01) |
| *G01V 1/28* | (2006.01) |

(Continued)

(52) U.S. Cl.
CPC ............. *G01V 1/008* (2013.01); *G01V 1/18* (2013.01); *G01V 1/22* (2013.01); *G01V 1/24* (2013.01); *G01V 1/247* (2013.01); *G01V 1/28* (2013.01); *G08B 21/18* (2013.01); *G08B 27/005* (2013.01); *H04L 67/12* (2013.01); *G01V 2210/1232* (2013.01); *G01V 2210/169* (2013.01); *G08B 25/12* (2013.01)

(58) Field of Classification Search
CPC .......... G01V 1/008; G01V 1/18; G01V 1/247; G01V 1/24; G01V 1/22; G01V 1/28; G01V 1/288; B66B 5/022; H04L 67/12; G01B 21/18

See application file for complete search history.

(56) References Cited

U.S. PATENT DOCUMENTS

| | | | |
|---|---|---|---|
| 5,099,751 A * | 3/1992 | Newman | A62B 3/00 454/187 |
| 6,392,538 B1 | 5/2002 | Shere | |

(Continued)

*Primary Examiner* — Munear T Akki
(74) *Attorney, Agent, or Firm* — HoustonHogle LLP

(57) ABSTRACT

A system and method for a distributed earthquake analysis and reporting system are provided. The system includes a facility control system at a facility that obtains earthquake information sent from one or more seismic sensors, and sends the earthquake information over a network directly or indirectly to other facility control systems. The facilities which include the facility control systems can be owned/operated by different business organizations or by the same organization, in examples. The facility control system at each facility responds to received earthquake information from the other facility control systems by configuring building systems such as public address systems to warn building occupants, industrial machine controllers to stop machinery, and elevator controllers to stop elevators at a nearest floor and open its doors, in examples.

30 Claims, 4 Drawing Sheets

(51) Int. Cl.
*G01V 1/18* (2006.01)
*G01V 1/24* (2006.01)
*G01V 1/22* (2006.01)
*G08B 27/00* (2006.01)
*G08B 25/12* (2006.01)

(56) References Cited

U.S. PATENT DOCUMENTS

| | | |
|---|---|---|
| 6,414,601 B1 | 7/2002 | Massedonio |
| 7,182,174 B2 | 2/2007 | Parrini et al. |
| 7,375,646 B1* | 5/2008 | Diaz-Lopez ............ G01V 1/008 340/521 |
| 7,681,696 B2 | 3/2010 | Yamagishi |
| 7,693,663 B2 | 4/2010 | Friedlander et al. |
| 7,905,329 B2 | 3/2011 | Urata |
| 9,366,770 B2 | 6/2016 | Kachi |
| 9,601,947 B2 | 3/2017 | Ogden |
| 2008/0209505 A1* | 8/2008 | Ghai ........................ G06F 21/55 726/1 |
| 2010/0169021 A1 | 7/2010 | Moisio |
| 2011/0066297 A1* | 3/2011 | Saberi ................. F16K 37/0091 700/287 |
| 2011/0280381 A1 | 11/2011 | Okamoto et al. |
| 2012/0025979 A1* | 2/2012 | Monnerie ............. G08B 25/006 340/539.22 |
| 2012/0112901 A1* | 5/2012 | Chasko ................... G08B 21/10 340/517 |
| 2012/0249321 A1* | 10/2012 | Hsuan .................... G08B 19/00 340/521 |
| 2016/0054460 A1 | 2/2016 | Jackson et al. |
| 2017/0073188 A1* | 3/2017 | Haipus ..................... B66B 5/024 |
| 2020/0003918 A1* | 1/2020 | Vancho .................. G08B 21/10 |

* cited by examiner

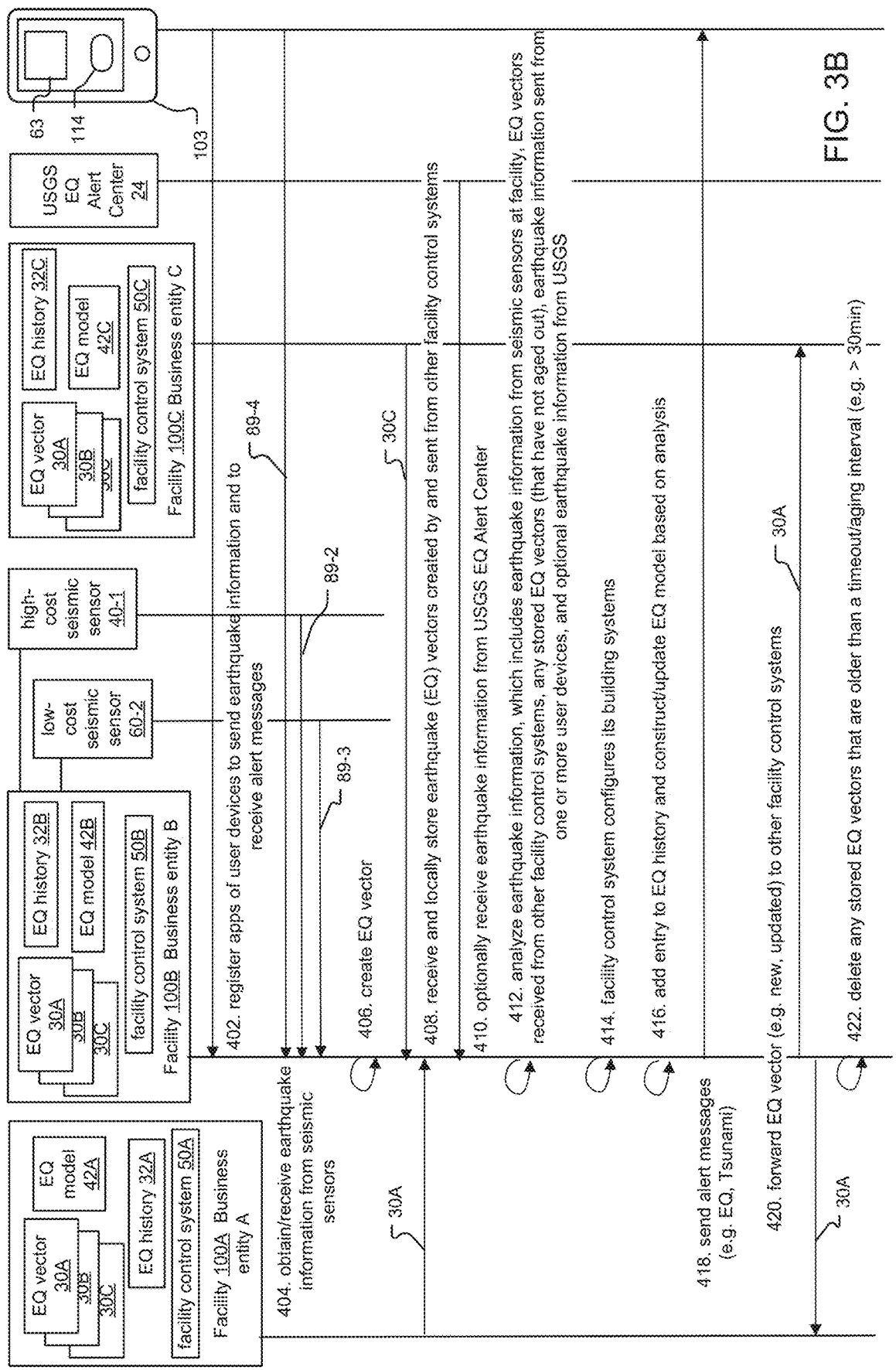

MULTI FACILITY EARTHQUAKE AUTOMATION SYSTEM AND METHOD

RELATED APPLICATIONS

This application is a Continuation of U.S. patent application Ser. No. 15/624,195, filed on Jun. 15, 2017, which is incorporated herein by reference in its entirety.

BACKGROUND OF THE INVENTION

Earthquakes are caused by a sudden release of built up energy created from tectonic forces within the Earth. The starting point of an earthquake is known as its epicenter. The strength of the earthquake dissipates as its waveforms radiate away from the epicenter. Most epicenters occur within the Earth's crust, being located approximately 40 km (25 mi) below the Earth's surface.

Detection of earthquakes is accomplished using seismometers, also known as seismic sensors. Seismic sensors detect ground motion by identifying the waveform of the motion and its magnitude. The magnitude measures the energy released at the source of the earthquake and is often expressed using the Richter scale. Richter scale numbers are calculated on prior/historical data, after the earthquake has occurred. However, real-time calculations must still be made based on the measured acceleration of the earthquake waveform at each location. Most destructive earthquakes typically have magnitudes between about 5.5 and 9 on the Richter scale.

The earthquake waveforms are generally of two main types: a Primary Wave (P Wave) and a Secondary Wave (S Wave). P waves are compression waveforms that shake the ground back and forth in the direction that the waveform is moving, where the displacement of the medium is in the same direction as the direction in which the waveform propagates. S waves, also known as shear or transverse waves, create oscillations that occur in a direction that is perpendicular to the direction of waveform motion/energy transfer. P waves travel fastest, are perceived first and arrive before S waves, and typically cause minimal damage. P waves have a velocity that typically ranges from 5 to 8 km/sec (3 to 5 mi/sec). S waves, in contrast, are more destructive than P waves, travel at approximately 60% the velocity of the P waves, and can move only through solids.

For the real time earthquake calculations, magnitudes of ground acceleration are also used as means to measure the intensity of an earthquake. The magnitude of acceleration of an earthquake is typically measured in G's or in $m/s^2$. Typical values for the magnitude of acceleration associated with the relative intensity of an earthquake include: 0.001 G (0.01 $m/s^2$), which is associated with an earthquake that people can perceive; 0.02 G (0.2 $m/s^2$), which is associated with an earthquake in which people can lose their balance; and 0.50 G (0.5 $m/s^2$), which is associated with a high intensity earthquake that causes significant damage to most buildings lacking adequate earthquake-resistant features and endangers personnel safety. However, buildings that are either originally designed with such protective features or have the features added to the buildings often incur minimal damage if the earthquake is short in duration.

SUMMARY OF THE INVENTION

Currently, people and managers of facilities have little or no advance notice of an earthquake. When an earthquake strikes, there is often not enough time for people to take actions to protect themselves and for managers of facilities to execute shutdown procedures at the facilities to minimize damage and property loss, and for protecting personnel.

The present invention provides a distributed network of facility control systems installed at different facilities/locations, each of which can detect earthquakes in the vicinity of the facilities. The facilities can be state and/or federal governmental facilities and private/public facilities such as hospitals, manufacturing complexes, housing developments, and/or shopping centers, and these facilities can be owned/operated by different business organizations, in examples.

In the distributed system, the facility control system of a facility at a location can detect a strength, time of occurrence, and region in which an earthquake occurs and provide this earthquake information to facility control systems of other facilities (in different locations). For this purpose, the facility control system at each facility receives earthquake information from multiple sources, including low and high cost distributed seismic sensors, compatible smart phone applications, and from facility control systems of other facilities, analyzes the earthquake information, and alert messages in the form of real-time notifications sent from the United States Geological Survey (USGS) Earthquake (EQ) Alert Center. The facilities control system(s) at each facility accept earthquake information input from multiple sources and can respond in an automated manner (such as by configuring building systems of the facility) to protect personal safety and the facility. This process is also known as earthquake automation.

The facility control system at each facility then reports the earthquake information directly or indirectly to the facility control systems of the other facilities. In one example, the seismic sensors installed at each of the different facilities send the earthquake information to the facility control system for analysis, and facility control system can quickly pinpoint the source of an earthquake from the analysis by measuring differences in the time it takes the seismic waves to reach the seismic sensors.

Earthquake information sent from facilities that are located closer to the epicenter of an earthquake, in one example, can be received and analyzed by the facility control systems of other facilities to predict when the other facilities will experience an earthquake and to estimate its magnitude and intensity. The accuracy of the predictions increase with an increasing number of facilities that participate in the detection and reporting of earthquakes in the distributed system.

In response to receiving earthquake information from other facilities, the facility control system of a given facility can predict the timing and strength of an upcoming earthquake and update its predicted magnitude and/or intensity. The facility control system updates its predictions as new earthquake information is received (e.g. from its local seismic sensors and/or from facility control systems of other facilities).

The facility control system of a facility can then execute pre-determined tasks or actions to protect personnel and property at the facility based upon the intensity for the earthquake it is predicting. To execute the tasks, in one example, the facility control system sends output signals to various building management systems at the facility.

The output signals sent to the building management systems are typically associated with specific intensity levels. In one example, for moderate earthquakes, which people/personnel can perceive but have a low chance of falling down, the output signals include signals which alert individuals within the facility via a Public Address (PA)

system and smart access control readers. For severe earthquakes, the output signals include those signals sent for moderate earthquake signals, and additional output signals sent to the building management systems.

The facility control system at a facility sends additional output signals to multiple building systems at the facility in the event of a severe earthquake. In examples, the facility control system sends output signals to the following exemplary building systems: access control systems controlling access control readers with integrated displays and sounders installed at doors of the building, where the signals allow individuals to pass freely through the doors during an earthquake, or can open or close predefined doors to route personnel to safer locations; elevator controllers for stopping elevators at the nearest floor and open the elevator doors; escalators and machinery controllers for stopping escalators/people movers and to stop industrial machinery; to instruct a Heating, Ventilation, and Air Conditioning (HVAC) System to provide negative air pressure within top floors of high rise buildings to avoid broken glass from raining down on people on the outside of the buildings; and to instruct a Water and Natural Gas controller to shut off natural gas and water lines (except water supply lines for fire sprinklers must not be interrupted), to list a few examples.

In general, according to one aspect, the invention features a distributed earthquake detection and reporting system. In the system, a facility control system at a facility obtains earthquake information sent from one or more seismic sensors, and sends the earthquake information over a network directly or indirectly to other facility control systems. The facility control system can then respond to received earthquake information from the other facility control systems by configuring building systems.

The facility control system can analyze the received earthquake information from the other facility control systems in conjunction with the earthquake information sent from its one or more local seismic sensors, produce updated earthquake information, and send the updated earthquake information over the network.

The facility control system can additionally and/or alternatively determine that an earthquake will occur in the vicinity of one or more buildings based upon the earthquake information sent from the one or more seismic sensors and the received earthquake information from the other facility control systems. In one example, the facility control system determines whether an earthquake will occur in a vicinity of one or more buildings in response to additionally receiving earthquake information received over the network from a public reporting center, such as a United States Geological Survey (USGS) alert center, if available.

In examples, the facility control system configures the building systems by sending shutdown control signals to the building systems and by sending output signals to user devices, such as mobile computing devices, carried by individuals. The facility control system can also configure the building systems by sending output signals to public address (PA) systems, fire alarm control systems, and/or to access control systems.

Typically, the one or more seismic sensors are mounted to fixed locations within one or more buildings. The one or more seismic sensors can also be included within the user devices carried by the users. Moreover, the facility control system and the other facility control systems can be operated by different business entities.

In an embodiment, the system additionally includes a connected services system that constructs an earthquake model from the earthquake information sent over the network from the facility control system and from the other facility control systems. The connected services system preferably stores the earthquake information sent over the network from the facility control system and the other facility control systems and distributes the earthquake information to the facility control systems. In this embodiment, the earthquake information is distributed indirectly over the network to the other facility control systems via the connected services system.

In another embodiment, the earthquake information is distributed directly over the network to the other facility control systems in a peer-to-peer relationship.

In general, according to another aspect, the invention features a method for a distributed earthquake analysis and reporting system. The method includes a facility control system obtaining earthquake information sent from one or more seismic sensors, and sending the earthquake information over a network directly or indirectly to other facility control systems. The method also includes the facility control system responding to received earthquake information from the other facility control systems by configuring building systems.

In one implementation, configuring the building systems is based upon a local predicted magnitude calculated from a magnitude of the received earthquake information in conjunction with magnitudes of the received earthquake information from the other facility control systems. The method can further construct an earthquake model from the earthquake information sent over the network from the facility control system and from the other facility control systems. Additionally and/or alternatively, the facility control system can construct an earthquake model from the earthquake information sent from the one or more seismic sensors and from the earthquake information sent over the network from the other facility control systems.

In another example, the facility control system configuring the building systems includes sending output signals to an elevator controller for stopping elevators controlled by the elevator controller at a nearest floor within buildings and for opening doors of the stopped elevators. The facility control system configuring the building systems can also include sending output signals to an industrial machine controller for stopping industrial machinery.

Additionally and/or alternatively, the facility control system configuring the building systems includes sending output signals to an HVAC system for placing the HVAC system of one or more buildings in a predefined state and for applying negative air pressure to floors near a top of the one or more buildings. The negative air pressure is applied to topmost floors of high rise buildings during earthquakes to help prevent glass from broken windows falling outside the buildings and onto people below. The facility control system configuring the building systems can also include sending output signals to a water and natural gas controller for shutting off natural gas and any water not supplied for fire suppression.

In general, according to yet another aspect, the invention features an earthquake response system at a facility. The system includes building systems that control mechanical and/or electrical equipment at one or more buildings of the facility, and one or more seismic sensors that are mounted to fixed locations within the one or more buildings. The system also includes a facility control system that obtains earthquake information sent from the one or more seismic sensors, and sends the earthquake information over a network directly or indirectly to other facility control systems. The facility control system then responds to received earthquake information from the other facility control systems by configuring the building systems.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3B is a sequence diagram that shows how the earthquake information can be distributed directly over the network to other facility control systems in a peer-to-peer relationship.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
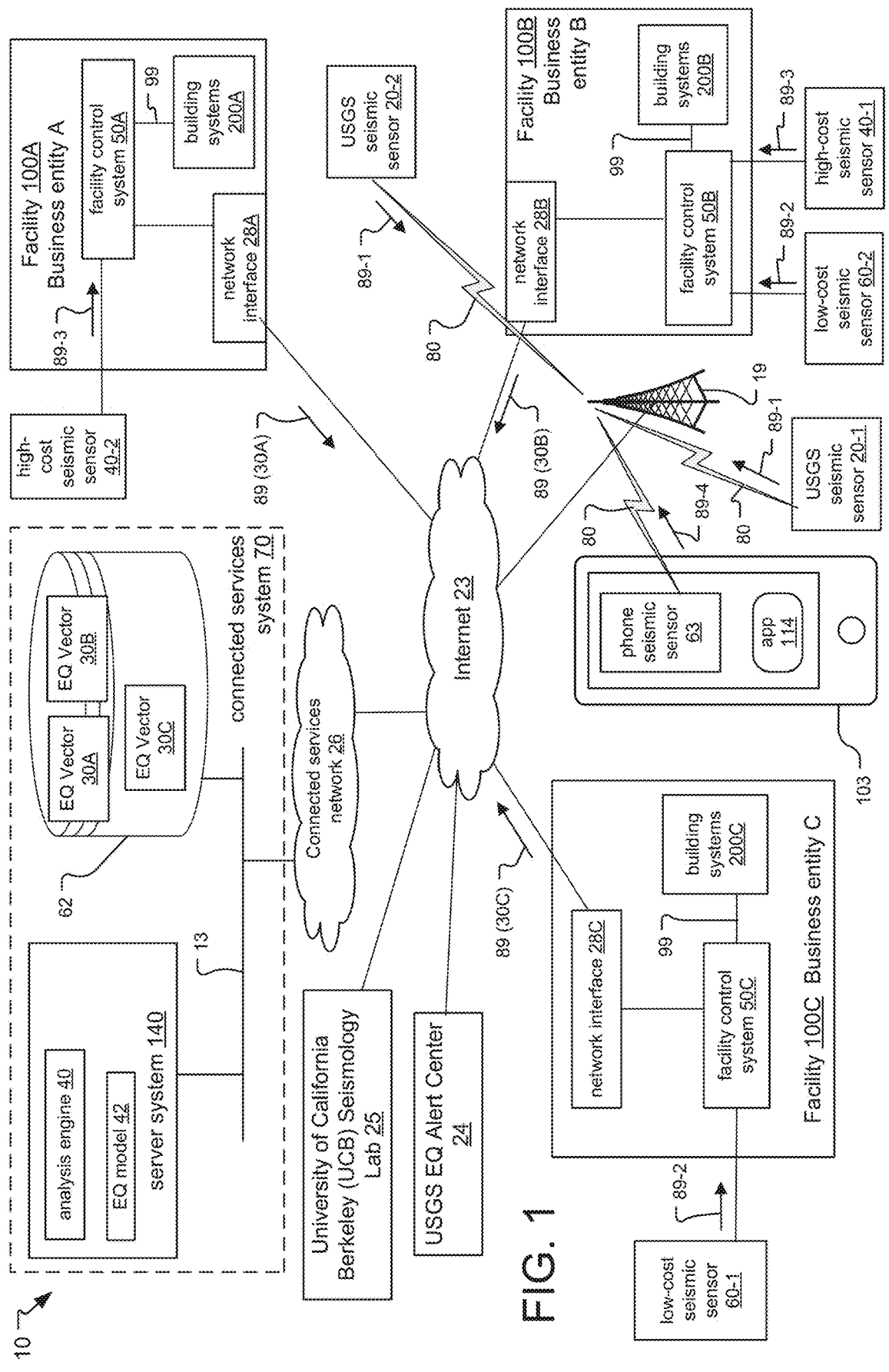
FIG. 1 is a schematic diagram of an exemplary earthquake analysis and reporting system.

FIG. 1 shows a distributed earthquake analysis and reporting system 10. Three exemplary facilities 100A/100B/100C are shown within the system 10, where each of the facilities are operated by different organizations such as business entities A, B, and C, respectively. Although, in other examples, all of the facilities can be owned by the same business entity. In other examples, the facilities 100 can be operated/owned by organizations such as governmental agencies and public/private entities. The system 10 also includes a USGS Earthquake (EQ) Alert Center 24, one or more user devices 103, and a connected services system 70.

The USGS EQ Alert Center 24 receives earthquake information 89-1 from multiple USGS seismic sensors 20, where two sensors 20-1 and 20-2 are shown. A transmission tower 19 receives wireless signals 80 that include the earthquake information 89-1 sent from the sensors 20-1 and 20-2, and the transmission tower 19 then forwards the earthquake information 89-1 via the tower's connection to the internet 23 onto the USGS EQ Alert Center 24. Based upon the earthquake information 89-1, the USGS EQ Alert Center 24 is developing an earthquake early warning capability that can calculate expected intensity and arrival time of an earthquake.

At each facility 100A/B/C, the facility control system 50 receives earthquake information 89 from various sources. The sources include seismic sensors installed at/near fixed locations such as within buildings at each facility 100A/B/C, smart phone seismic sensors 63 located within mobile user devices 103, and a USGS EQ Alert Center 24, in examples. The seismic sensors at each facility 100A/B/C include possibly a combination of high cost seismic sensors 40 and low cost seismic sensors 60 that send earthquake information 89-3 and 89-2, respectfully, to the facility control system 50 at each facility 100A/B/C.

Further, the smart phone seismic sensors 63 send earthquake information 89-4 via apps 114 executing on an operating system of the user devices to the facility control systems 50. However, the earthquake information 89-4 is limited by the fact that transducers of the phone seismic sensors 63 typically "roll off" at 20 Hz (i.e. cannot detect frequencies below 20 Hz), where most earthquakes oscillate at an order of magnitude lower than 20 Hz.

The USGS EQ Alert Center 24 also sends earthquake information 89-1 obtained by the USGS seismic sensors 20 to the facility control systems 50. In one example, the phone seismic sensor 63 is an application executing upon the operating system of the user device 103 that accesses the smart phone accelerometer as the seismic sensor.

The facility control system 50 at each facility 100 can also prepare new and/or updated earthquake information 89 from the earthquake information 89-1 through 89-4 and transmits the new/updated earthquake information 89 to other facility control systems 50 in the form of earthquake vectors (EQ vector) 30.

The contents of the EQ vector 30 are based upon the earthquake information 89 received from the seismic sensors at each facility, in one example. Preferably, the facility control system 50 at each facility 100 provides its earthquake information 89 to other facility control systems by sending EQ vectors 30 over a network such as the internet 23. In this way, the earthquake information 89 distributed among the facility control systems 50 is in a common format that facilitates parsing and analysis.

An EQ vector 30 typically includes a timestamp indicating creation of the EQ vector, standard information associated with earthquakes and/or derived from earthquake information 89 received from seismic sensors, and optionally proprietary information. The standard information associated with earthquakes includes: a type of waveform detected (P-Wave or S-Wave); magnitude of acceleration in G's or m/s$^2$; the time that the waveform was detected; the location in latitude and longitude (e.g. degrees, minutes, seconds) of the waveform; and a local soil condition defined by on-site geologists during initial setup and installation of the seismic sensors prior to an earthquake event.

The low cost seismic sensors 60 include a basic accelerometer and execute vibration sensing along three axes. The low cost seismic sensors are typically attached to fixed locations within office buildings and light industrial/commercial facilities and store peak acceleration for a fixed number of seismic events. The high cost seismic sensors 40, in contrast, are typically ruggedized real-time computer systems that include more sophisticated and sensitive accelerometers and instrumentation. The high cost seismic sensors are typically installed in harsh industrial environments and/or can be buried in the ground and located on bedrock.

User devices 103 executing user applications ("apps") 114 and including a phone seismic sensor 63 can also provide earthquake information 89-4. In one example, the app 114 is the "MyShake" app developed at University of California, Berkeley (UCB) and the phone seismic sensor 63 is a simple motion sensor that records the time and amplitude of a tremor and sends the data and the phone's location to UCB's seismological lab 25 over the internet 23 for analysis.

While a user device's 103 phone seismic sensor 63, or accelerometer, is less sensitive than the low and high-cost seismic sensors installed in the ground or within fixed locations of buildings, the phone seismic sensor 63 can record earthquakes above a magnitude of 5 within 10 km (6.2 miles). The sheer number of potential users carrying the user devices 103 provides advantages, with an estimated 16 million smartphone user devices 103 located in California alone and about over 1 billion worldwide. MyShake can be downloaded for free from Google's Play store, and an iPhone app 114 is planned. Google Play is a registered trademark of Google, Inc. and iPhone is a registered trademark of Apple, Inc. Here, transmission tower 19 sends wireless signals 80 in the form of cellular data between the phone seismic sensor 63 and/or app 114.

In the illustrated example, facility 100A includes facility control system 50A, building systems 200A, and network interface 28A. Facility control system 50A receives earthquake information 89-3 from high cost seismic sensor 40-2 installed near/within a building of facility 100A. The facility control system 50A analyzes the earthquake information 89-3, creates EQ vector 30A in response, and sends its earthquake information over the internet 23 or other public/private network via its network interface 28A. Because the earthquake information 89 that facility control system 50A provides to other facility control system 50B/50C is in the form of an EQ vector 30A, the provided information is indicated by reference "89 (30A)".

In a similar fashion, facility 100B includes facility control system 50B, building systems 200B, and network interface 28B. Facility control system 50B receives earthquake information 89-2 from low cost seismic sensor 60-2 and earthquake information 89-3 from high cost seismic sensor 40-1, where the seismic sensors 60-2 and 40-1 are installed near/within one or more buildings of facility 100B. The facility control system 50B analyzes the earthquake information 89-2/89-3, creates EQ vector 30B in response, and sends its earthquake information over the internet 23 or other public/private network via its network interface 28A. Because the earthquake information 89 that facility control system 50B provides to other facility control system 50A/ 50C is in the form of an EQ vector 30B, the provided information is indicated by reference "89 (30B)".

Facility 100C includes facility control system 50C, building systems 200C, and network interface 28C. Facility control system 50C receives earthquake information 89-2 from low cost seismic sensor 60-1 installed near/within one or more buildings of facility 100C. The facility control system 50C analyzes the earthquake information 89-2, creates EQ vector 30C in response, and sends its earthquake information over the internet 23 or other public/private network via its network interface 28C. Because the earthquake information 89 that facility control system 50C provides to other facility control system 50A/50B is in the form of an EQ vector 30C, the provided information is indicated by reference "89 (30C)".

The connected services system 70 is located on a network (e.g. connected services network 26) that is often remote to the different organizations, in one example. The connected services system 70 receives EQ vectors 30A/B/C sent from the different facility control systems 50A/B/C and can store the EQ vectors 30 to a database 62. A server system 140 of the connected services system 70 includes an analysis engine 40 that can construct an earthquake model (EQ model) 42 from the received and/or stored EQ vectors 30. The server system 140 communicates with the database 62 over a local network 13.

The connected services system 70 can also provide the EQ vectors 30 and/or the EQ model 42 to the different facility control systems 50A/B/C over the internet 23 via the connected services network 26.

Each of the facility control systems 50 respond to received earthquake information 89 from the other facility control systems 50 by configuring building systems 200. In one example, facility control system 50A receives earthquake information 89 sent from facility control systems 50B and 50C, and can send output signals 99 to configure its building systems 200A in response.

Figure 2:
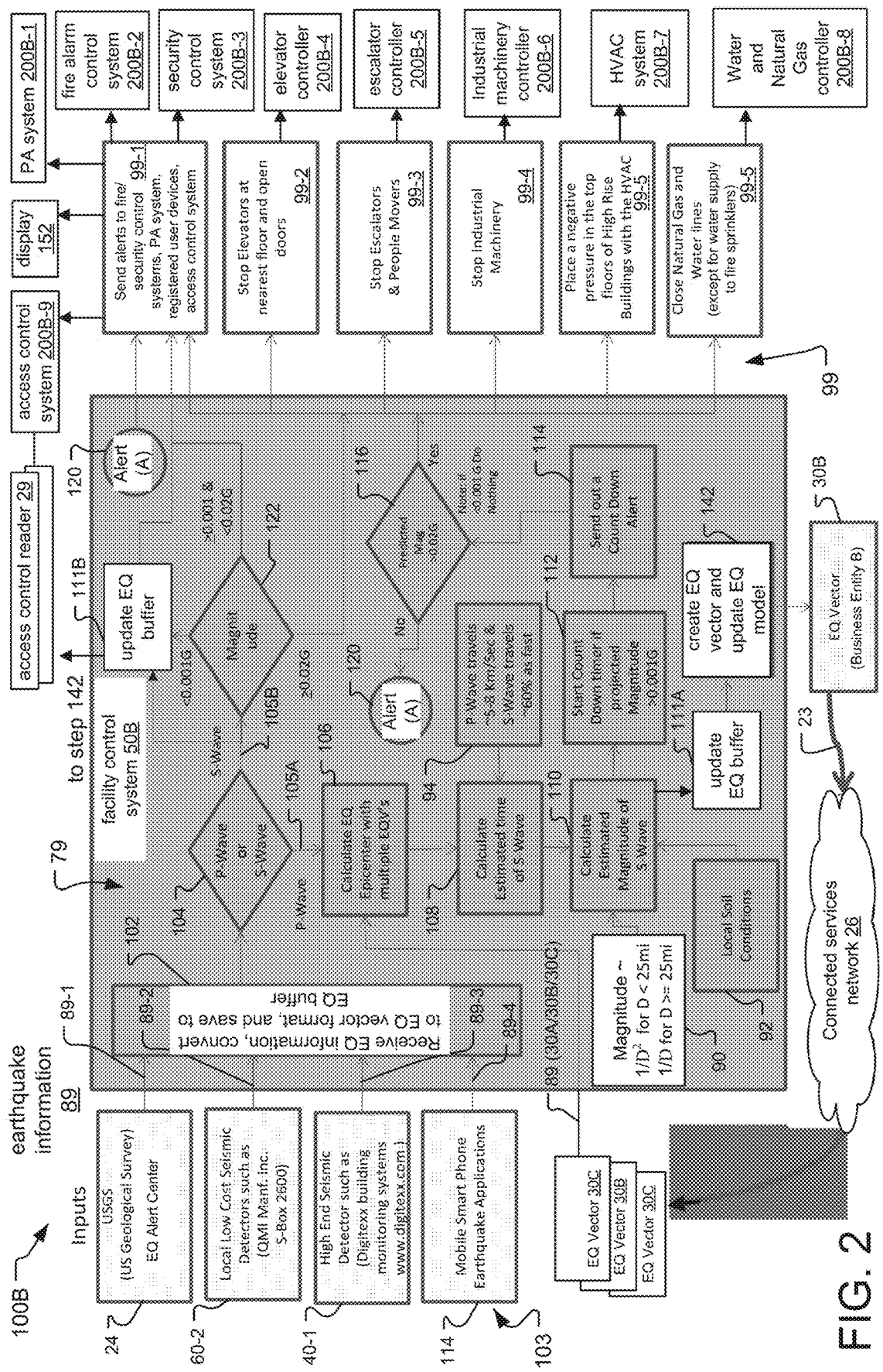
FIG. 2 is a hybrid flow chart and schematic diagram that shows both a method of operation for and more detail associated with a facility control system of FIG. 1, where the facility control system configures building systems at a facility in response to receiving earthquake information from other facility control systems.

FIG. 2 shows more detail for facility control system 50B at facility 100B in FIG. 1. The facility control system 50B receives earthquake information 89 from various input sources, analyzes the earthquake information 89, and configures building systems 200B in response. An exemplary method 79 of operation of the facility control system 50B is described hereinbelow. In one example, the facility control system 50B is a computer system within the facility 100B that executes one or more software processes and/or firmware modules that implement the capabilities described in method 79.

In step 102, the facility control system 50B receives earthquake (EQ) information 89 from various input sources, converts the EQ information 89 to EQ vector format, and saves the resulting formatted data to an EQ buffer. The input sources of earthquake information 89 and the particular earthquake information 89 provided by each source include: a USGS EQ alert center 24 that provides earthquake information 89-1; low-cost seismic sensor 60-2 that provides earthquake information 89-2; high-cost seismic sensor 40-1 that provides earthquake information 89-3; one or more user devices 103 executing apps 114 which provide earthquake information 89-4 obtained from a phone seismic sensor 63 of the user device 103, and earthquake information 89 sent from other facility control systems.

In step 104, the facility control system 50B determines whether the information in the EQ buffer indicates an S wave or P wave type of earthquake waveform. If a P wave, the method 79 follows an execution path indicated by reference 105A; if an S wave, the method follows an execution path indicated by reference 105B.

The steps associated with execution path 105A (P wave) are described first, followed by the steps associated with execution path 105B (S wave).

For execution path 105A, beginning at step 106, the facility control system 50B receives earthquake information from other facility control systems 50A/50C in the form of EQ vectors 30A/30C. Then, based upon the multiple received EQ vectors 30 in conjunction with the contents of the EQ buffer, the facility control system 50B calculates an epicenter of the earthquake. For a single facility/location reporting an earthquake, in one example, an epicenter distance can be calculated with P wave and S wave time deltas. When two facilities at different locations report earthquake information, the facility control system 50B will calculate a closest possible epicenter relative to the facilities. Finally, when facility control systems of three or more facilities report earthquake information, the prediction will become more accurate with an increasing number of facility control systems 50 at facilities reporting their earthquake information.

It is also important to note that another input source of earthquake information to step 106 can be an EQ vector 30B previously calculated/created according to a prior execution of method 79. This is also indicated by reference 89 (30B).

The calculation of the epicenter in step 106 uses the following equation for processing each EQ vector 30 sent from the same location (based on Distance=Time*Velocity):

$$d = \Delta t (v_p v_s)/v_p - v_s$$

Where:
d=Distance (km)
t=Time in Sec
$v_p$=Velocity of P-Wave ($v_p$ is typically 5-8 Km/Sec)
$v_s$=Velocity of S-Wave ($v_s$ is typically 60% of $v_p$)

As multiple EQ vectors are received, the epicenter distance will be recalculated for improved accuracy. For example, after two locations (e.g. two different facility control systems 50A and 50C) report their earthquake information via EQ vectors 30A/30C, a new (approximate) epicenter is determined from the epicenters of the EQ vectors 30A/30C until more earthquake information 89 is received. After more earthquake information 89 is received, such as via EQ vectors 30 from three or more different facility control systems 50/facilities 100, the epicenter location and velocity of the P wave and/or S wave can be recalculated for improved accuracy.

According to step 108, the facility control system 50B calculates the estimated time of an S wave. For this purpose, the facility control system 50B utilizes the fact that P waves typically travel between 5-8 Km/sec and that S waves generally travel 60% as fast, as indicated by reference 94. Then, in step 110, the facility control system 50B calculates the estimated magnitude (e.g. intensity) of the S wave.

After receiving the first EQ vector 30 from another location/facility control system 50, the facility control system 50B calculates a local predicted magnitude (LPM). For this purpose, the LPM is based upon a number of factors. In one example, the LPM is based upon the measured magnitude of the earthquake measured at the other facility control systems 50 (Measured Magnitude) and the distance D between each of the other facility control systems 50 and the facility control system 50B, the values of which are either included within or can be calculated from the received EQ vector 30. More specifically, as indicated by reference 90, the local predicted magnitude (LPM) is given by LPM α(Measured Magnitude)*$1/D^2$ if D<25 miles, whereas LPM α (Measured Magnitude)*$1/D$ if D>=25 miles.

Another factor for calculating the LPM includes a determination of the local soil conditions at the facility 100 by a geologist, as indicated by reference 92. In examples, buildings with footings of sand can reduce the LPM, while building having footings in bedrock typically increase the LPM. In general, as more EQ vectors 30 are received, the epicenter location, velocity of P-Wave and S-Wave, estimated time of arrival and the LPM can be recalculated in real time and warnings adjusted accordingly.

The facility control system 50B then tailors its response to the received earthquake information 89 based on ranges of values of the LPM, which rank the earthquake according to its severity. A low level earthquake, in one example, is an earthquake typically having a LPM of 0.001 G or less. The value of 0.001 G is the threshold at which individuals can perceive an earthquake. A moderate earthquake has an LPM between 0.001 G to 0.02 G, and a severe earthquake generally has an LPM greater than or equal to 0.02 G. The value of 0.02 G is the threshold at which individuals typically lose their balance and can fall.

Returning to step 110 of method 79, upon calculation of the LPM, the facility control system 50B updates the contents of the EQ buffer to include the LPM in step 111A and transitions to step 112.

In step 111A, regardless of the severity of the earthquake, the facility control system 50B updates the contents of the EQ buffer to include the LPM, and creates a new (or updated) EQ vector 30B in step 142 from the contents of the EQ buffer. Also in step 142, the facility control system 50B updates an EQ model 42 from the EQ buffer and sends the new/updated EQ vector 30B over the internet 23 to the connected services system 26, in one example. The connected services system 26, in turn provides the new/updated EQ vector 30B as input to the facility control system 50B and to other facility control systems 50A/50C. Additionally and/or alternatively, the facility control system 50B in step 142 can send the new/updated EQ vector 30B over the internet 23 directly to other facility control systems 50A/50C.

According to step 112, if the LPM indicates at least that a moderate earthquake has occurred (which individuals can sense), the facility control system 50B starts a timer and sends a countdown alert in step 114 upon expiration of the timer. If the LPM in step 116 is associated with a moderate earthquake, the facility control system as indicated by reference 120 sends alert messages in the form of output signals 99-1 to different building systems 200B. The building systems 200B control mechanical and/or electrical equipment at one or more buildings of the facility 100B, in one example.

For a moderate earthquake, in examples, the facility control system 50B sends output signals 99-1 to configure building control systems 200B such as PA system 200B-1, fire alarm control system 200B-2 and security control system 200B-3, and access control system 200B-9.

In more detail, in one example, the output signals 99-1 sent to the access control system 200B-9 configure the access control system 200B-9 to send associated control messages to access control readers 29 connected to and controlled by the access control system 200B-9. The control messages can specify to open/unlock all doors at which the access control readers 29 are installed, and/or to open or close predefined doors to route personnel to safer locations as part of a "shelter in place" precaution. In other example, the output signals 99-1 instruct the PA system 200B-1 to send audible warnings to building occupants, the fire alarm control system 200B-2 to alert first responders and to activate sounders such as sirens and to activate visual indicators such as strobes, and the security control system 200B-3 to activate emergency/backup power and lighting systems and to notify security personnel to assist with personnel evacuation and safety efforts. The output signals 99-1 also instruct intelligent display systems 152 to display emergency evacuation information and send alert messages such as SMS messages to registered user devices 103. Additionally and/or alternatively, the access control readers 29 can also incorporate the displays 152, sounders and visual indicators.

If the LPM in step 116 is associated with a severe earthquake, the facility control system 50B sends alert messages in the form of output signals 99-1 to configure the same building systems and displays 152 as in the moderate earthquake modality, and additionally sends output signals 99-2 through 99-5 to configure building systems 200B-4 through 200B-8. During a severe earthquake, however, the signals 99-1 sent to the displays 152 and the building systems such as the PA system 200B-1, fire alarm control system 200B-2, security control system 200B-3, and access control system 200B-9 are typically of a more comprehensive nature than the signals 99-1 sent to the same systems as in the moderate earthquake modality. In examples, output signals 99-2 instruct elevator controllers 200B-4 to stop elevators controlled by the controllers 200B-4 at the nearest floor and open the elevator doors. Output signals 99-3 instruct an escalator controller 200B-5 to stop escalators and people movers. Output signals 99-4 instruct an industrial machinery controller 200B-6 to stop industrial machinery. Output signals 99-5 instruct an HVAC system 200B-7, in one example, to place the HVAC system 200B-7 in a predefined state and to apply a negative air pressure upon the top floors of high rise buildings at the facility 100B to prevent glass from windows breaking and subsequently falling on individuals located outside the buildings and below the windows. Output signals 99-5 instruct a water and natural gas controller 200B-8 to close all natural gas and water lines, with the exception of water lines that feed fire sprinklers of the fire alarm control system 200B-2 (i.e. water provided for fire suppression).

For execution path 105B, the facility control system 50B updates the EQ buffer in step 111B and determines a response based on the actual magnitude of the earthquake in step 122. Here, the facility control system 50B determines a severity of the earthquake based upon the magnitude of the earthquake using the same range values as utilized in execution path 105A, and configures the building systems 200B in response in a similar fashion.

As a result, in one example, the facility control system 50B at facility 100B can determine that an earthquake will occur in the vicinity of one or more buildings of the facility 100B based upon the earthquake information 89 sent from the one or more seismic sensors 20/40/60/63 and the received earthquake information 89 from other facility control systems 50B/50C at other facilities 100B/100C of the distributed system 10.

Figure 3A:
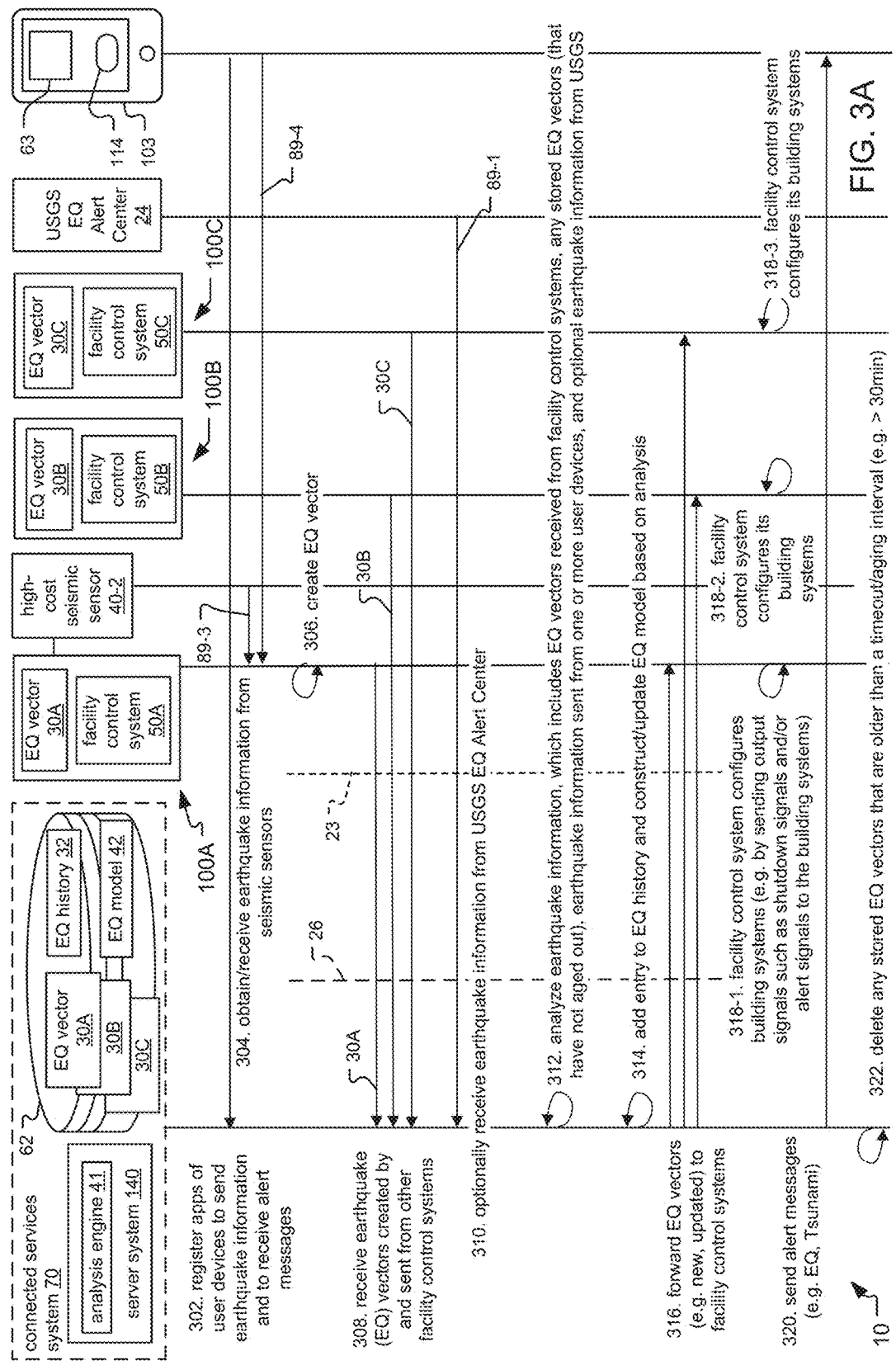
FIG. 3A is a sequence diagram that shows how the earthquake information can be distributed indirectly over the network to other facility control systems via a connected services system.

FIG. 3A shows how earthquake information 89 in the distributed system 10 can be distributed indirectly over the network (e.g. internet 23) from exemplary facility control system 50A of facility 100A to other facility control systems 50B and 50C of facilities 100B and 100C via a connected services system 70. Here, the indirect relationship is illustrated from the viewpoint of connected services system 70 and its interactions with other facility control systems 50A, 50B, and 50C.

In step 302, facility control system 50A of facility 100A registers apps 114 of user devices 103 to send earthquake information 89-4 and to receive alert messages. In step 304, facility control system 50A obtains/receives earthquake information 89-3 from its high-cost seismic sensor 40-2 and earthquake information 89-4 from phone seismic sensors 63 of one or more registered user devices 103.

In step 306, facility control system 50A creates an EQ vector 30A from the earthquake information 89-3/89-4. According to step 308, connected services system 70 receives earthquake information in the form of EQ vectors 30A/30B/30C created by and sent from facility control systems 50A/50B/50C. The connected services system 70 optionally receives earthquake information 89-1 from the USGS EQ Alert Center 24 in step 310.

According to step 312, the connected services system 70 analyzes the earthquake information 89 which includes EQ vectors 30A/30/30B, any locally stored EQ vectors (that have not aged out), earthquake information 89-4 sent from one or more user devices 103, and optional earthquake information 89-1 from the USGS EQ Alert Center 24. In one example, an analysis engine 41 running on a server system 140 of the connected services system 70 can execute an analysis to determine the type of earthquake and its severity/magnitude similar to that described by method 79 of the facility control system 50 in FIG. 2.

In step 314, the connected services system 70 adds an entry to EQ history 32 and constructs/updates EQ model 42 based on the analysis. The connected services system 70 then forwards the EQ vectors 30 (e.g. new, updated) to all member facility control systems 50A/50B/50C of the distributed system 10. Then, in step 318-1, facility control system 50A configures its building systems 200A in response, by sending output signals 99 such as shutdown signals and or alert signals to the building systems 200A. In a similar fashion, facility control system 50B configures its building systems 200B in response at step 318-2, and facility control system 50C configures its building systems 200C in response at step 318-4.

Then, in step 320, the connected services system 70 sends alert messages (e.g. earthquake, Tsunami) to registered user devices 103. In step 322, the connected services system 70 deletes any stored EQ vectors that are older than a timeout/aging interval (e.g. >30 min).

FIG. 3B shows how earthquake information 89 in the distributed system 10 can be distributed directly over a network (e.g. internet 23) from each facility control system 50 to other facility control systems 50 in a peer-to-peer relationship. Each facility control system 50 functions as a node in a distributed communications system, where each of the facility control systems 50 can function as a client, server, or both. Here, the peer-to-peer relationship is illustrated from the viewpoint of exemplary facility control system 50B and its interactions with other facility control systems 50A and 50C.

In step 402, facility control system 50B of facility 100B registers apps 114 of user devices 103 to send earthquake information 89-4 and to receive alert messages. In step 404, facility control system 50B obtains/receive earthquake information 89 from seismic sensors. In examples, facility control system 50B receives earthquake information 89-2 from its low-cost seismic sensor 60-2, earthquake information 89-3 from its high-cost seismic sensor 40-1, and earthquake information 89-4 from phone seismic sensors 63 running upon one or more user devices 103. According to step 406, facility control system 50B creates an EQ vector 30B from the earthquake information 89.

Then, in step 408, facility control system 50B receives and locally stores earthquake (EQ) vectors 30A and 30C created by and sent from other facility control systems 50A and 50C. The facility control system 50B optionally receives earthquake information 89-1 from the USGS EQ Alert Center 24 in step 410.

According to step 412, the facility control system 50B analyzes the earthquake information 89, which includes earthquake information 89-2/89-3 from seismic sensors 40-1/60-2 at facility 100B, EQ vectors 30A/30C received from other facility control systems 50A/50C, any stored EQ vectors (that have not aged out), earthquake information 89-4 sent from one or more user devices 103, and optional earthquake information 89-1 from the USGS EQ Alert Center 24. In step 414, facility control system 50B configures its building systems 200B in response by sending output signals such alert signals and shutdown signals to the building systems 200B.

In step 416, the facility control system 50B adds an entry to its local EQ history 42B and construct/updates a local EQ model 42B based on the analysis in step 412. The facility control system 50B in step 418 then send alert messages (e.g. earthquake, tsunami) to apps 114 of registered user devices 103 carried by building occupants and other individuals. According to step 420, the facility control system 50B forwards its EQ vector 30B (e.g. new, updated) to other facility control systems 50A/50C. Finally, in step 422, the facility control system 50B deletes any stored EQ vectors 30A/30B/30C that are older than a timeout/aging interval (e.g. >30 min).

It can also be appreciated that facility control systems 50A and 50C in FIG. 3B similarly distribute and update earthquake information 89 in a peer-to-peer fashion as that shown and described for facility control system 50B. Facility 100A, via its facility control system 50A, stores EQ vectors 30A/30B/30C, and calculates/updates a local EQ model 42A and EQ vector 30A. Facility control system 50A also writes entries to its EQ history 32A log for each iteration of newly received and/or updated earthquake information 89 from its own seismic sensors and from other facility control systems 50B/50C, in examples. Facility control system 50A can then send the updated EQ vector 30A directly to the other facility control systems 50B and 50C. Facility 100C, via its facility control system 50C, similarly stores EQ vectors 30A/30B/30C, calculates/updates a local EQ model 42C and EQ vector 30A, writes entries to its EQ history 32C log, and sends the EQ vector 30A directly to other facility control systems 50A/50B.

While this invention has been particularly shown and described with references to preferred embodiments thereof, it will be understood by those skilled in the art that various changes in form and details may be made therein without departing from the scope of the invention encompassed by the appended claims.

What is claimed is:

1. A distributed earthquake analysis and reporting system, the system comprising:
   a facility control system for a facility that obtains earthquake information sent from one or more seismic sensors, and sends the earthquake information over a network directly or indirectly to other facility control systems for other facilities;
   wherein the facility control system responds to received earthquake information from the other facility control systems by configuring building systems of the facility, which control mechanical and/or electrical equipment at one or more buildings of the facility, the other facility control systems respond to the earthquake information sent over the network by the facility control system, and the facility control system configuring the building systems includes sending output signals to the building systems to execute pre-determined actions to protect people and property at the facility, and wherein the facility control system at each of the facilities provides the earthquake information to the other facility control systems using a common format for facilitating parsing and analysis by the different facility control systems.

2. The system of claim 1, wherein the facility control system analyzes the received earthquake information from the other facility control systems in conjunction with the earthquake information sent from the one or more seismic sensors, produces updated earthquake information, and sends the updated earthquake information over the network.

3. The system of claim 1, wherein the facility control system determines that an earthquake will occur in the vicinity of one or more buildings based upon the earthquake information sent from the one or more seismic sensors and the received earthquake information from the other facility control systems.

4. The system of claim 3, wherein the facility control system determines whether an earthquake will occur in a vicinity of one or more buildings in response to additionally receiving earthquake information received over the network from a United States Geological Survey (USGS) alert center.

5. The system of claim 1, wherein the facility control system configuring the building systems includes sending shutdown control signals to the building systems.

6. The system of claim 1, wherein the facility control system configuring the building systems includes sending output signals to user devices carried by individuals, fire alarm control systems, and/or to access control systems.

7. The system of claim 1, wherein the one or more seismic sensors are mounted to fixed locations within one or more buildings.

8. The system of claim 1, wherein the one or more seismic sensors are included within user devices carried by users.

9. The system of claim 1, wherein the facility control system and the other facility control systems are operated by different business entities.

10. The system of claim 1, wherein the earthquake information is distributed directly over the network to the other facility control systems in a peer-to-peer relationship.

11. The system of claim 1, wherein the earthquake information is distributed indirectly over the network to the other facility control systems via a connected services system.

12. The system of claim 1, wherein the facility control system configuring the building systems includes sending output signals to an elevator controller for stopping elevators controlled by the elevator controller at a nearest floor within buildings and for opening doors of the stopped elevators.

13. The system of claim 1, wherein the facility control system configuring the building systems includes sending output signals to an industrial machine controller for stopping industrial machinery.

14. The system of claim 1, wherein the facility control system configuring the building systems includes sending output signals to an HVAC system for placing the HVAC system of one or more buildings in a predefined state and for applying negative air pressure to floors near a top of the one or more buildings.

15. The system of claim 1, wherein the facility control system configuring the building systems includes sending output signals to a water and natural gas controller for shutting off natural gas and any water not supplied for fire suppression.

16. A method for a distributed earthquake analysis and reporting system, the method comprising:
a facility control system for a facility obtaining earthquake information sent from one or more seismic sensors, and sending the earthquake information over a network directly or indirectly to other facility control systems for other facilities;
the facility control system responding to received earthquake information from the other facility control systems by configuring building systems of the facility, which control mechanical and/or electrical equipment at one or more buildings of the facility, wherein the facility control system configuring the building systems includes sending output signals to the building systems to execute pre-determined actions to protect people and property at the facility; and
the other facility control systems responding to the earthquake information sent over the network by the facility control system,
wherein the facility control system at each of the facilities provides the earthquake information to the other facility control systems using a common format for facilitating parsing and analysis by the different facility control systems.

17. The method of claim 16, wherein configuring the building systems is based upon a local predicted magnitude calculated from a magnitude of the received earthquake information in conjunction with magnitudes of the received earthquake information from the other facility control systems.

18. The method of claim 17, wherein the output signals sent to the building systems are based on different intensity levels of an earthquake as indicated by the calculated local predicted magnitude.

19. The system of claim 8, wherein the one or more seismic sensors included within the user devices send the earthquake information to the facility control systems via apps executing on an operating system of the user devices.

20. The system of claim 1, wherein the facility control system configuring the building systems includes sending output signals to an access control system to open or close predefined doors to route personnel of the facility to safe locations.

21. The system of claim 1, wherein the common format of the earthquake information includes earthquake vectors, and the facility control system receives the earthquake information from the one or more seismic sensors, converts the earthquake information to earthquake vector format, and stores the resulting formatted data in an earthquake buffer.

22. The system of claim 21, wherein the earthquake vectors include timestamps, standard information associated with earthquakes and/or information derived from the one or more seismic sensors.

23. The system of claim 21, wherein the facility control system analyzes earthquake vectors received from the other facility control systems in conjunction with contents of the earthquake buffer, updates the contents of the earthquake buffer based on the analysis of the received earthquake vectors and the earthquake buffer, creates new or updated earthquake vectors based on the updated contents of the earthquake buffer, and sends the new or updated earthquake vectors to the other facility control systems.

24. The system of claim 19, wherein the apps access accelerometers of the user devices.

25. The system of claim 1, further comprising a connected services system that constructs an earthquake model from the earthquake information sent over the network from the facility control system and from the other facility control systems.

26. The system of claim 1, further comprising a connected services system that stores the earthquake information sent over the network from the facility control system and the other facility control systems and distributes the earthquake information to the facility control systems.

27. The method of claim 16, further comprising distributing the earthquake information directly over the network to the other facility control systems in a peer-to-peer relationship.

28. The method of claim 16, further comprising the facility control system constructing an earthquake model from the earthquake information sent from the one or more seismic sensors and from the earthquake information sent over the network from the other facility control systems.

29. An earthquake response system at a facility, the system comprising:
building systems that control mechanical and/or electrical equipment at one or more buildings of the facility; and
one or more seismic sensors that are mounted to fixed locations within the one or more buildings; and
a facility control system that obtains earthquake information sent from the one or more seismic sensors, and sends the earthquake information over a network directly or indirectly to other facility control systems of other facilities;
wherein the facility control system responds to received earthquake information from the other facility control systems by configuring the building systems, and the facility control system configuring the building systems includes sending output signals to the building systems to execute pre-determined actions to protect people and property at the facility, and wherein the facility control system at each of the facilities provides the earthquake information to the other facility control systems using a common format for facilitating parsing and analysis by the different facility control systems.

30. A distributed earthquake analysis and reporting system, the system comprising:
a facility control system that obtains earthquake information sent from one or more seismic sensors, and sends the earthquake information over a network directly or indirectly to other facility control systems;
wherein the facility control system responds to received earthquake information from the other facility control systems by configuring building systems, and the other facility control systems respond to the earthquake information sent over the network by the facility control system, and the facility control system configuring the building systems includes sending output signals to an elevator controller for stopping elevators controlled by the elevator controller at a nearest floor within buildings and for opening doors of the stopped elevators, sending output signals to an industrial machine controller for stopping industrial machinery, sending output signals to an HVAC system for placing the HVAC system of one or more buildings in a predefined state and for applying negative air pressure to floors near a top of the one or more buildings, and sending output signals to a water and natural gas controller for shutting off natural gas and any water not supplied for fire suppression, and wherein each facility control system provides the earthquake information to the other facility control systems using a common format for facilitating parsing and analysis by the different facility control systems.

* * * * *